March 18, 1958 W. NUSS 2,827,097
FLOATING NUT AND TWO-PART RETAINER THEREFOR
Filed Jan. 25, 1955
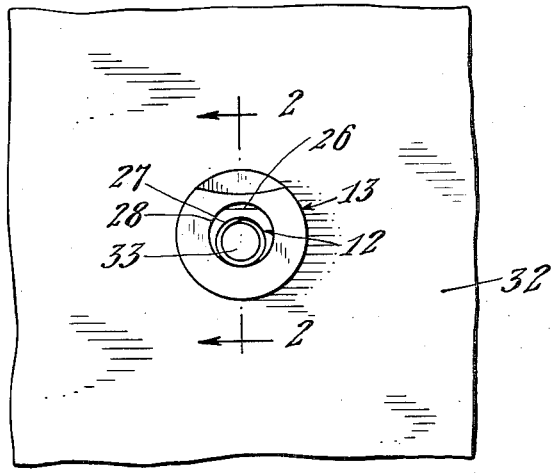
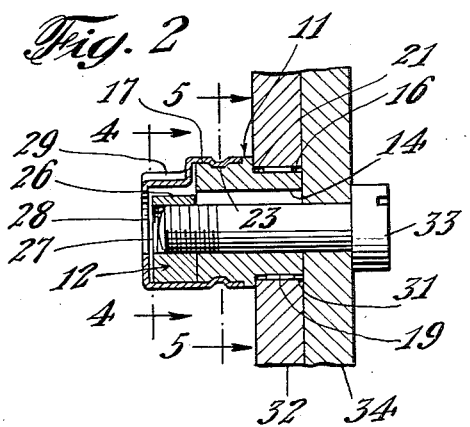
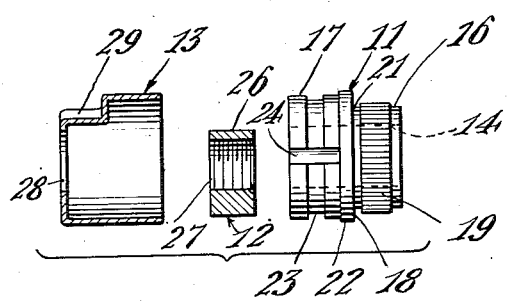
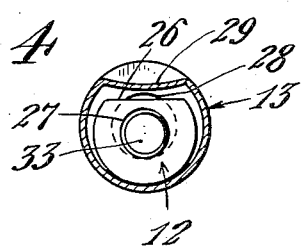
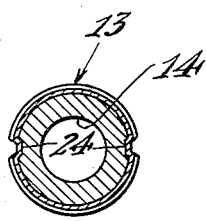
INVENTOR.
WILLIAM NUSS
BY
ATTORNEY Paiented Mar. 18, 1958

2,827,097

FLOATING NUT AND TWO-PART RETAINER THEREFOR

William Nuss, Elmont, N. Y.

Application January 25, 1955, Serial No. 483,870

1 Claim. (Cl. 151—41.73)

The present invention relates primarily to floating nut structures and more particularly to improvements in such structures.

An object of the present invention is to provide a floating nut arrangement of improved and simplified design that is easily and cheaply manufactured, and that includes a minimum number of elements.

Another object of the present invention is to provide a floating nut structure wherein the nut has greater freedom of movement to adjust itself to a bolt or screw than the previous floating nut structures.

Still another object of the present invention is to provide a floating nut structure that is easily attached to a member such as a plate, and requires only a single hole through the member, and through which the bolt or screw threaded on the nut also extends.

Still another object of the present invention is to provide a floating nut structure that is applicable to members having drilled or punched circular through holes therein, blind holes, or holes inaccessible from one side of the members.

The above and further objects and features of the invention will be more apparent in the following detailed description of the preferred embodiment thereof, wherein reference is made to the accompanying drawings, in the latter of which:

Fig. 1 is an elevational view showing the floating nut structure of the present invention associated with or installed on a piece of relatively thin plate or sheet material;

Fig. 2 is a sectional view taken substantially on line 2—2 of Fig. 1, showing the floating nut structure of the present invention and illustrating the manner in which it cooperates with a bolt or machine screw to hold two plate sections together;

Fig. 3 is an exploded view of the elements comprising the floating nut structure of the present invention, with some of the elements thereof in section; and Figs. 4 and 5 are sectional views taken substantially on lines 4—4 and 5—5, respectively, of Fig. 2.

Referring now to the drawings, the elements comprising the floating nut structure of the present invention include a splined body element indicated generally by reference numeral 11, a nut indicated generally by reference numeral 12, and a retainer or cage member indicated generally by reference numeral 13. The splined body element 11 is provided with a centrally located clearance hole 14 extending therethrough, and the right hand end 16 thereof, as shown in Figs. 2 and 3, is of somewhat smaller diameter than the main section 17. Thus a shoulder surface 18 is formed at the junctions of the two sections 16 and 17 which serves as a stop or seat when the unit is installed in a plate or other material in the manner hereinafter described. The end section 16 has a splined or knurled surface, as at 19, on the greater part of the outer surface thereof with an undercut 21 at the shoulder surface 18.

The main section 17 of the body element 11 has a circular flange 22 at its right hand end and a circular peripheral groove 23 adjacent the center thereof. A pair of diametrically opposite axial notches 24 extending from the left hand end of the body element 11 to the flange 22.

The nut 12 of the unit is a round disc-shaped element of suitable thickness with a flat surface 26 formed or otherwise provided on the periphery or one side thereof. The center of the nut has a suitable thread 27.

The retainer or cage member 13 is substantially cup-shaped with an opening 28 in the end thereof, and has a depressed section 29 therein which, as hereinafter set forth, cooperates with the flat 26 on the nut 12 to prevent it from rotating when the units are assembled.

In assembling the unit the nut 12 is placed in the retainer 13 and the latter is then placed on the left hand end of the body element 11. The retainer 13 is then locked on the body element 11 by staking or depressing the periphery of the retainer into the groove 23 and is prevented from rotating with respect thereto by staking or depressing the sides thereof into the axial grooves 24. Since the outside diameter of the nut 12 is somewhat less than that of the inner end of the retainer 13, substantial radial movement of the nut is permitted while at the same time the flat 26 on the nut cooperates with the depressed section 29 of the retainer to prevent rotation of the nut relative thereto.

The assembled floating nut structure is adapted for mounting by forcing the same into a circular hole such as 31 in a plate 32 of a thickness substantially the same as or slightly less than the length of the knurled end 16 of the body element 11. The knurled section 19 engaging the inner surface of the hole 31 prevents the structure from rotating in the hole 31. Thus a machine screw 33 extending through a plate 34 to be attached to the plate 32 and threaded into the nut 12 holds the two plates together. Since the clearance hole 14 is somewhat larger than the body of the screw 33 and radial movement within limits of the nut is possible, precise alignment of the holes in the two plates is not required.

As the screw 33 is tightened, the shoulder surface 18 if not seated against the plate 32 is pressed thereagainst as the inner face of the nut 12 presses against the end of the body element 11. These clamping or pressing actions tend to assist in preventing the nut 12 from turning with respect to the body element 11 and the body element from turning in the hole 31 in the plate.

Thus there is provided a floating nut structure that does not require special shaped or auxiliary holes in the member in which it is mounted, that is easily installed, and that is easy and cheap to manufacture.

While the invention has been shown and described in but a single embodiment thereof, it will be obvious that various modifications and changes may be made therein without departing from the spirit or essential attributes thereof, and it is desired therefore that only such limitations be placed thereon as are imposed by the appended claim.

What is claimed is:

In a floating nut structure, a body member having a knurled end adapted for forced insertion in a cylindrical hole in a plate with the knurls preventing rotation thereof relative to said plate, said body member having a uniform diameter central clearance hole for a threaded bolt inserted therein from the opposite side of said plate, a shoulder formed by an enlarged section on said body member for limiting the extent of insertion thereof in the plate hole, a retaining member on the end of said body member opposite said knurled end, an internally threaded flat substantially disc-shaped nut member having a flat surface on the periphery thereof loosely retained within said retainer and with the axis thereof parallel to said body member clearance hole, a circular groove formed in the outer surface of said enlarged section of said body member and one or the more axial notches in the outer surface of said enlarged section of said body member, means including overlaying sections of said retaining member forced into said groove and notch to prevent removal from and relative rotation of said retaining member with respect to said body member, said retaining member having a depressed section in the periphery thereof and means including a flat surface on said nut member and the depressed section of said retaining member to permit limited radial and axial movement and limited axial rotation of said nut member relative to said body member.

References Cited in the file of this patent

UNITED STATES PATENTS

| | | |
|---|---|---|
| 2,144,553 | Simmonds | Jan. 17, 1939 |
| 2,163,134 | Semion | June 20, 1939 |
| 2,249,923 | Whitcombe | July 22, 1941 |
| 2,401,824 | Gladden | June 11, 1946 |
| 2,707,508 | Durst | May 3, 1955 |

FOREIGN PATENTS

| | | |
|---|---|---|
| 495,976 | Great Britain | Nov. 23, 1938 |
| 729,521 | Germany | Dec. 17, 1942 |